Patented Apr. 14, 1953

2,635,079

UNITED STATES PATENT OFFICE 2,635,079

ANTIFOAM MATERIAL

Emery I. Valko, Mountain Lakes, N. J., and Jonas Kamlet, New York, N. Y., assignors to E. F. Drew & Co., Inc., New York, N. Y., a corporation of Delaware No Drawing. Original application October 27, 1948, Serial No. 56,912. Divided and this application September 7, 1949, Serial No. 114,454

4 Claims. (Cl. 252—358)

The present invention is directed to materials adapted for the treatment of aqueous media and more particularly to a composition intended to prevent or reduce foaming. This application is a division of co-pending application Serial No. 56,912, filed October 27, 1948, now abandoned and entitled "Method of and Material for Treating Boiler Water."

The use of boilers generating steam at high pressure has become very common and such boilers produce steam at pressures of 200 lbs. up 1500 or 2000 lbs. per square inch. Under such conditions small amounts of impurities in the water have a tendency to cause foaming in the boilers and the carrying over of liquid particles which enter other apparatus and cause detrimental effects. This difficulty has been known for some time and various attempts to correct the tendency to foam have been made. In the prior art, it was proposed to add relatively small amounts of various compounds in order to reduce foaming and such additions have been of some value for this purpose. Some of such compounds were not compatible with other substances used in the treatment of water for use in boilers. Also, a relatively large quantity of such compounds were necessary in order to give effective results and some difficulties in using them arose.

The present invention is intended and adapted to overcome the difficulties and disadvantages inherent in the prior art, it being among the objects of the present invention to provide a composition adapted for introduction into aqueous media, such as in high pressure boilers, which is compatible with other substances used in treating water and which is highly effective in reducing or eliminating foaming.

It is also among the objects of the present invention to provide a composition for treatment of aqueous media which may be readily and cheaply produced from easily available raw materials and which is stable under the conditions of use.

The present invention is based upon the conception that compounds of a certain type are eminently suitable for use in preventing or eliminating foaming when added to boiler waters or other aqueous media in extremely small amounts. These compounds are the C-alkyl N-acylamido alkyl imidazolines of such chemical composition that they are water-insoluble. In addition, such compounds contain at least two carbon-containing radicals, the sum of the carbons of said two radicals being at least 24. The compounds of the present invention have the following structural formula:

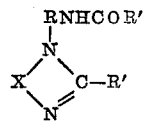

wherein X may be alkyl, aryl, aralkyl, homocyclic and heterocyclic, and in which the two nitrogen atoms attached to said radical are on adjacent carbon atoms. R is a hydrocarbon radical having from 2 to 4 carbon atoms and R' is a hydrocarbon radical having from 9 to 29 carbon atoms. Among the radicals designated by the letter X are the following: ethylene, propylene, phenylene and substitution products thereof. The R' groups are usually straight chain compounds but they may be branched chain, aryl or aralkyl.

The following are specific examples of the operation of the present invention.

Example 1

270 parts by weight of commercial stearic acid are mixed with 52 parts by weight of diethylenetriamine, being in the molecular ratio of 2 to 1. The mixture is agitated, a gentle stream of nitrogen is passed through the same and the mixture is heated over a period ranging from 1 hour to 1½ hours, to a temperature of about 215° C. at atmospheric pressure. A small amount of distillate is removed from the reacting mixture during the heating up period.

Then 2.5 parts by weight of diethylenetriamine are added to the reaction mass and the temperature of 215° C. is maintained for about 1½ hours under a pressure of about 5 mm. obtained by progressively decreasing the pressure in the system. An additional amount of distillate is recovered from the reaction vessel during the vacuum heating. The reaction taking place is as follows:

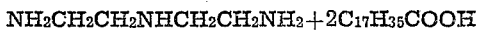

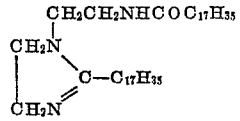

The product contains three hydrophylic nitrogen radicals which are highly effective in preventing foaming of boiler water under high temperature and high pressure. The long chain hydrocarbon radicals, one of them on the heterocyclic ring and the other on the side chain, render the substance water-insoluble and thus effectively maintain the foam reducing properties of the compound.

An equivalent amount of such higher carboxylic acids, as behenic, may replace stearic in the process.

*Example 2*

The compound of Example 1 is emulsified or dispersed for ready application to boiler feed waters since the compound alone is water-insoluble. The following composition is made:

| | Pounds |
|---|---|
| Product of Example 1 | 48 |
| Hydroxy acetic acid (70% aqueous solution) | 4 |
| Light lubricating mineral oil | 20 |
| Water | 328 |

The several constituents are thoroughly mixed whereby a reaction takes place forming the hydroxy acetate of the imidazoline. The light to medium lubricating fraction of the mineral oil renders the composition more fluid and stabilizes the emulsion with the water.

The composition, which is quite fluid, is introduced into the feed water at the rate of 2 parts of the composition to 1,000,000 parts of the water. Because of the fluidity of the emulsion it is readily dispersed in the feed water and is quite effective in preventing foaming.

*Example 3*

A reaction is caused to occur between 2 mols. of talloil and 1 mol. of diethylenetriamine. The talloil is a mixture of saturated and unsaturated higher fatty acids with a lesser amount of rosin or similar acid. The entire mixture is liquid although the rosin is a solid material.

The reaction is carried on in the same manner as that described in Example 1 whereby a mixed imidazoline composition is formed. The exact chemical combinations are not known but it is probable that there are compounds in which R' and R'' of the general structural formula are radicals having different numbers of carbon atoms and different degrees of unsaturation. The product may be used as indicated in other examples.

*Example 4*

A reaction is conducted in the same manner as in Example 1, substituting for the stearic acid lauric acid, which may be substantially pure, or may be admixed with very small amounts of concomitant fatty acids of coconut oil.

*Example 5*

Instead of a single fatty acid, there is used as starting material the higher mixed fatty acids derived by splitting of coconut oil and fractionating the fatty acids. The fraction containing acids of 10 and the higher carbon acids are used. This mixture is reacted in the ratio of 2 mols. with 1 mol. of diethylenetriamine as set forth in Example 1.

A composition containing the product is as follows:

| | Per cent |
|---|---|
| Above product | 15 |
| Water | 80 |
| Propylene glycol | 3.25 |
| Polyethylene glycol 300 mono-oleate | 1.75 |

The mono-oleate acts as a dispersing or emulsifying agent whereby the mixed imidazoline is dispersed in the water. The propylene glycol has the function of providing a soft consistency to the resulting paste. The composition may then be applied to the feed water for boilers.

*Example 6*

A mixture is made of 1 mol. of stearic acid with 1 mol. of diethylenetriamine and the mixture is heated to a temperature of about 215° C. until a reaction has taken place, whereby the imidazoline ring formation takes place. While still maintaining the reaction temperature, 1 mol. of myristic acid is added and the reaction is continued until the acid has reacted and the acyl radical thereof is attached to the available nitrogen.

The product may be used as indicated for treatment of boiler feed waters.

*Example 7*

A composition is made of any of the above described imidazolines in the following proportions by weight:

| | Per cent |
|---|---|
| Imidazoline | 13.20 |
| Coconut oil soap (50% soln.) | 4.05 |
| NaOH (85% soln.) | 1.05 |
| Tannic acid | 4.20 |
| Polyethylene glycol (600 mol. wt.) monooleate | 3.00 |
| Water | 74.50 |

The tannic acid forms sodium tannate with the caustic soda and this is mixed with the molten imidazoline whereby a complex is formed. The complex is emulsified by the soap and monooleate to form a stable emulsion with the water. The use of the two emulsifying agents gives a better emulsion than when only one of such agents is applied. The composition is introduced into the feed water at the rate of one part thereof to 1,000,000 parts of water. The composition has been found compatible with various materials used in boiler water treatment, such as alginates, tannins and others.

*Example 8*

450 parts by weight of commercial stearic acid is mixed with 135 parts by weight diiso-propylene triamine (representing a ratio of 2 mols. acid to 1 mol. amine with a slight excess of the latter) and heated first at atmospheric pressure and later under vacuum. The temperature is brought up gradually from 150° to 240° C. and then the heating continues under vacuum, which gradually is increased from 40 mm. to 5 mm. of mercury for 1½ hours at 215° C. The water of condensation liberated during the reaction corresponds to approximately 3 mols. per mol. amine indicating the formation of an amido glyoxalidine of the following formula:

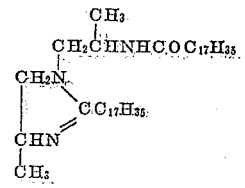

The compounds and compositions of the present invention have properties which render them highly suitable for application to boiler feed waters. They are extremely efficient in eliminating foaming even when used in small quantities. They are easy to introduce into the water and are compatible with other boiler water treatments. Also, they are stable under the high temperatures found in high pressure boilers. They are easily prepared by a simple process from readily available and comparatively cheap raw materials. No highly skilled workmen are necessary to operate the process and a simple apparatus is sufficient. Duplication of the products in a series of batches is readily obtained.

The substances are adapted for use in various operations where water or aqueous solutions are so treated as to incidentally produce undesirable foam. For instance, in plants for the production of yeast in breweries and in similar operations, the course of fermentation often causes foaming and it is desired to reduce or eliminate the same. The present substances may be added to vats in which the fermentation takes place, in suitable amounts and at such intervals as will minimize or eliminate the foaming. The substances may also be added to the water before it enters the operation if this appears desirable or feasible. Similarly in other operations where the substances do not interfere with the reactions taking place, they may be added for the elimination of the foam.

Although the invention has been described setting forth several specific embodiments thereof, the invention is not limited thereto but various changes in the details may be made within the spirit of the invention. For instance in place of the fatty acids enumerated in the specific examples, other acids, either synthetic or natural, having from 10 to 30 carbon atoms may be used in place thereof or in conjunction therewith. Single acids as well as mixtures of acids are suitable for the purpose. Among the acids which have been found satisfactory are those contained in the higher boiling fraction obtained from coconut oils. The amount of the imidazoline which may be used in boiler water may be varied over a wide range and it has been found that from .5 to 10 parts per million of feed water gives satisfactory results. Other emulsifying agents than those specifically named may be used, such as Turkey red oil, alkyl aryl sulphonates, alkylphenolpolyglycol ethers, and others, all of which have been described in the literature. In place of tannic or hydroxyacetic acid, other suitable acids may be used in conjunction with the imidazolines. The imidazolines may have added thereto alginic acid or an alkali metal phosphate.

We claim:

1. A composition suitable for the treatment of aqueous media to prevent foaming consisting essentially of a water dispersion of a compound having the following general formula:

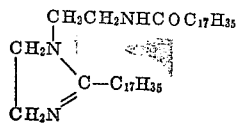

in the form of its complex with an acid taken from the class consisting of hydroxyacetic and tannic.

2. A composition suitable for the treatment of aqueous media to prevent foaming consisting essentially of a water dispersion of a compound having the following general formula:

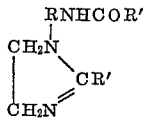

wherein R is a hydrocarbon radical having from 2 to 4 carbon atoms, and R' is a hydrocarbon radical having from 9 to 29 carbon atoms, in the form of its complex with an acid taken from the class consisting of hydroxyacetic and tannic.

3. A composition suitable for the treatment of aqueous media to prevent foaming consisting essentially of a water dispersion of a compound having the following general formula:

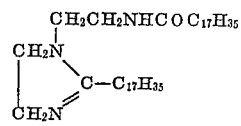

in the form of its complex with an acid taken from the class consisting of hydroxyacetic and tannic acid and containing alginates.

4. A composition suitable for the treatment of aqueous media to prevent foaming consisting essentially of a water dispersion of a compound having the following general formula:

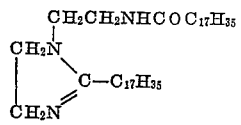

in the form of its complex with an acid taken from the class consisting of hydroxyacetic and tannic and containing a mixture of soap and poly-ethylene-glycol mono-oleate.

EMERY I. VALKO.
JONAS KAMLET.

References Cited in the file of this patent

UNITED STATES PATENTS

| Number | Name | Date |
| --- | --- | --- |
| 2,484,146 | Barber et al. | Oct. 11, 1949 |